United States Patent
Ayyar et al.

(10) Patent No.: US 9,604,130 B1
(45) Date of Patent: Mar. 28, 2017

(54) SOCIAL GAME PLAY USING SOCIAL NETWORK FEATURES

(75) Inventors: Kartik Ayyar, San Francisco, CA (US); Christopher Ryan Antimary, San Francisco, CA (US); Joseph Dao, San Francisco, CA (US); Revant Kapoor, San Francisco, CA (US); Zhuohao Shao, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 518 days.

(21) Appl. No.: 13/474,437

(22) Filed: May 17, 2012

Related U.S. Application Data

(60) Provisional application No. 61/578,746, filed on Dec. 21, 2011.

(51) Int. Cl.
*A63F 13/00* (2014.01)

(52) U.S. Cl.
CPC .................... *A63F 13/00* (2013.01)

(58) Field of Classification Search
CPC ............... A63F 13/12; A63F 2300/407; A63F 2300/50; A63F 2300/572
See application file for complete search history.

(56) References Cited

U.S. PATENT DOCUMENTS

| | | | |
|---|---|---|---|
| 2007/0218997 A1* | 9/2007 | Cho .............................. | 463/42 |
| 2009/0291750 A1* | 11/2009 | Herrmann ...................... | 463/25 |
| 2010/0216553 A1* | 8/2010 | Chudley et al. ................ | 463/42 |
| 2012/0289339 A1* | 11/2012 | Wang ..................... | A63F 13/12 463/42 |

OTHER PUBLICATIONS http://www.slashkey.com/forum/forumdisplay.php?f=162, Game Guide Chapters 01-19, PDF pages.*
http://en.wikipedia.org/wiki/Farm_Town, pdf pp. 1-4.*
http://paradivision.com/blog/2009/05/farm-town-an-under-the-radar-facebook-social-gaming-success-story-in-the-making/, pdf pp. 1-4.*
Animal Crossing—Wild World Manual NDS, pp. 1-24, www.replacementdocs.com.*
Animal Crossing Wild World Ninendo DS Review at IGN, pp. 1-9, www.ds.ign.com/articles/673/673671p3.html.*
FarmVille—Walkthrough and Guide, pp. 1-23, http://web.archive.org/web/20111024152508/http://www.casualgameguides.com/games/guide/game_guide.cfm/Farmville-Walkthrough/Cheats-1/game_id-8679.*

* cited by examiner

*Primary Examiner* — Omkar Deodhar
*Assistant Examiner* — Shauna-Kay Hall
(74) *Attorney, Agent, or Firm* — Schwegman Lundberg & Woessner, P.A.

(57) ABSTRACT

An apparatus and method for integrating social game play with social network features is disclosed herein. Content generated in the game is posted to the social network to initiate social game play. Recipients of the content that respond to the content are automatically taken to the game to join the game in a controlled manner. Recipients' interaction with the game may be selectively reviewed and incorporated into a playing space associated with an existing player of the game.

9 Claims, 13 Drawing Sheets

SOCIAL GAME PLAY USING SOCIAL NETWORK FEATURES

CROSS-REFERENCE TO RELATED APPLICATIONS

This application claims priority to U.S. Provisional Patent Application No. 61/578,746, filed Dec. 21, 2011, entitled "Social game play using social network features," the content of which is incorporated herein by reference in its entirety.

TECHNICAL FIELD

The present disclosure relates to social networks and games in general, and in particular embodiments, to combining social networks with computer-implemented online games.

BACKGROUND

Many games provide a virtual world or some other imagined playing space where a player of the game controls one or more player characters, engages in in-game actions, and/or acquires in-game assets. Player characters (also referred to as characters or PCs) can be considered in-game representations of the controlling player. A game engine accepts inputs from the player, determines player character actions, decides outcomes of events and presents the player with a game display illuminating what happened. In some games with multiple players, each player may control one or more player characters.

A player of a game can directly engage in in-game actions or indirectly via a player character in a role-playing game. For example, in-game actions may include building a virtual town, growing virtual crops, going on a quest, buying/selling virtual items from a virtual store, and the like. Many games also support acquisition of in-game assets (also referred to as rewards or loot) by a player in order to facilitate control of player characters or to perform in-game actions. Examples of in-game assets include, but are not limited to, acquiring game points, gold coins, experience points, character levels, character attributes, virtual cash, game keys, and other in-game items of value within the game.

In an online game, a specific playing space, game settings, in-game assets, etc. (collectively referred to as game attributes) may be uniquely associated with each player of the game. The specific game attributes for a given player may be accessed using a particular username and password. Accordingly, unless a player knows the username and password (or other access information required by the game) of another player, the player can only play within his/her own playing space using his/her own in-game assets. In other words, the player does not have access to another player's playing space, game settings, in-game assets, and the like. This may be true even for multi-player games. A first player may engage in in-game actions and interact with a second player in a common playing space. Nevertheless, the first player may not have access to the second player's in-game assets because those in-game assets are associated with and only accessible by the second player. The second player similarly may not have access to the first player's in-game assets.

BRIEF DESCRIPTION OF THE DRAWINGS

Some embodiments are illustrated by way of example and not limitations in the figures of the accompanying drawings, in which.

The headings provided herein are for convenience only and do not necessarily affect the scope or meaning of the claimed invention.

DETAILED DESCRIPTION

The following description is presented to enable any person skilled in the art to create and use a computer system configuration and related method and article of manufacture to provide social game play using social network features. A player of an online game identifies a specific area within his/her playing space for others to engage in social game play. The player also initiates a message from within the game inviting others to play in the user-identified specific area of the player space. The player of the game also has an account in a separate social network platform. Within the social network platform there exists a set of users that are deemed to be the player's subscribers, followers, friends, or recipients. Such followers automatically receive content generated by the player. Notably, the message generated from within the game by the player for others to engage in social game play is automatically posted to the social network platform, and in particular, to each of the player's followers on the social network. When any of the followers expresses interest in engaging in social game play from within the social network platform, a restricted version of the player's playing space—namely the specific area previously specified by the player—is provided to the follower. The follower may build, decorate, play, or otherwise interact with the specific area and save those interactions. The follower notifies the player of the saved interaction with the specific area, which may be deemed to be a submission to the player. A plurality of such submissions, from one or more followers, may be submitted to the player. The player can then selectively review the submissions from within the game, and select one for incorporation into the player's actual playing space. The player can further generate message(s) regarding the winning submission and have those message(s) automatically post to the social network platform for his/her followers.

Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are not shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
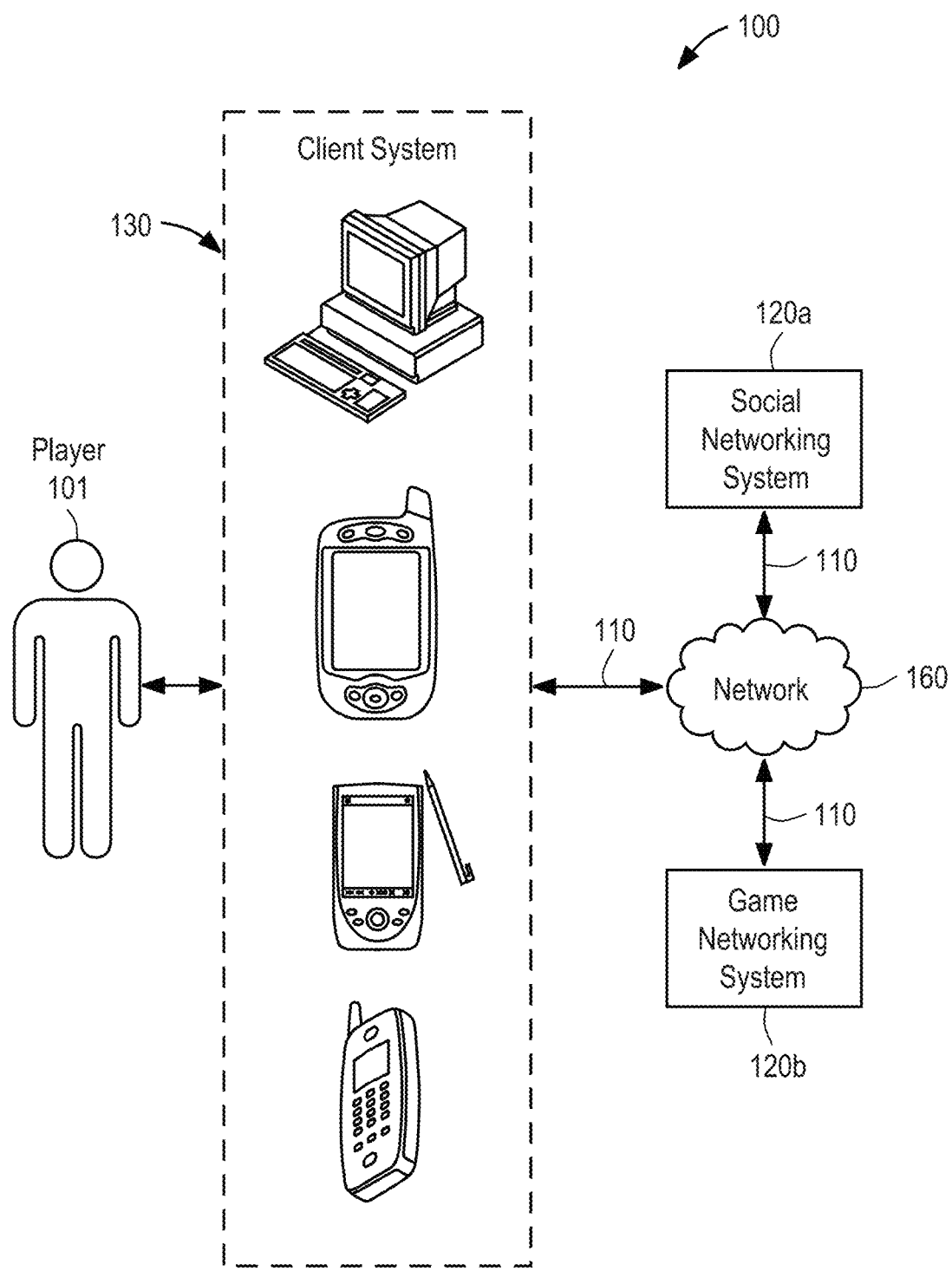
FIG. 1 illustrates an exemplary system for implementing various disclosed embodiments for providing social network content within a game.

FIG. 1 illustrates an exemplary system 100 for implementing various disclosed embodiments. In particular embodiments, system 100 comprises player or user 101, social networking system 120a, game networking system 120b, client system 130, and network 160. The components of system 100 can be connected to each other in any suitable configuration, using any suitable type of connection. The components may be connected directly or over a network 160, which may be any suitable network. For example, one or more portions of network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Social networking system 120a is a network-addressable computing system that can host one or more social graphs. Social networking system 120a can generate, store, receive, and transmit social networking data. Social networking system 120a can be accessed by the other components of system 100 either directly or via network 160. Game networking system 120b is a network-addressable computing system that can host one or more online games. Game networking system 120b can generate, store, receive, and transmit game-related data, such as, for example, game account data, game input, game state data, and game displays. Game networking system 120b can be accessed by the other components of system 100 either directly or via network 160. Player 101 may use client system 130 to access, send data to, and receive data from social networking system 120a and game networking system 120b. Client system 130 can access social networking system 120 or game networking system 120b directly, via network 160, or via a third-party system. As an example and not by way of limitation, client system 130 may access game networking system 120b via social networking system 120a. Client system 130 can be any suitable computing device, such as a personal computer, laptop, cellular phone, smart phone, computing tablet, etc.

Although FIG. 1 illustrates a particular number of players 101, social networking systems 120a, game networking systems 120b, client systems 130, and networks 160, this disclosure contemplates any suitable number of players 101, social networking systems 120a, game networking systems 120b, client systems 130, and networks 160. As an example and not by way of limitation, system 100 may include one or more game networking systems 120b and no social networking systems 120a. As another example and not by way of limitation, system 100 may include a system that comprises both social networking system 120a and game networking system 120b. Moreover, although FIG. 1 illustrates a particular arrangement of player 101, social networking system 120a, game networking system 120b, client system 130, and network 160, this disclosure contemplates any suitable arrangement of player 101, social networking system 120a, game networking system 120b, client system 130, and network 160.

The components of system 100 may be connected to each other using any suitable connections 110. For example, suitable connections 110 include wireline (such as Digital Subscriber Line (DSL) or Data Over Cable Service Interface Specification (DOCSIS)), wireless (such as Wi-Fi or Worldwide Interoperability for Microwave Access (WiMAX)), or optical (such as Synchronous Optical Network (SONET) or Synchronous Digital Hierarchy (SDH)) connections. In particular embodiments, one or more connections 110 each include an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between player 101, social networking system 120a, game networking system 120b, client system 130, and network 160, this disclosure contemplates any suitable connections between player 101, social networking system 120a, game networking system 120b, client system 130, and network 160. As an example and not by way of limitation, in particular embodiments, client system 130 may have a direct connection to social networking system 120a or game networking system 120b, bypassing network 160.

In an online computer game, a game engine manages the game state of the game. Game state comprises all game play parameters, including player character state, non-player character (NPC) state, in-game object state, game world state (e.g., internal game clocks, game environment), and other game play parameters. Each player 101 controls one or more player characters (PCs). The game engine controls all other aspects of the game, including non-player characters (NPCs), and in-game objects. The game engine also manages game state, including player character state for currently active (online) and inactive (offline) players.

An online game can be hosted by game networking system 120b, which can be accessed using any suitable connection with a suitable client system 130. A player may have a game account on game networking system 120b, wherein the game account can contain a variety of information associated with the player (e.g., the player's personal information, financial information, purchase history, player character state, game state). In some embodiments, a player may play multiple games on game networking system 120b, which may maintain a single game account for the player with respect to all the games, or multiple individual game accounts for each game with respect to the player. In some embodiments, game networking system 120b can assign a unique identifier to each player 101 of an online game hosted on game networking system 120b. Game networking system 120b can determine that a player 101 is accessing the online game by reading the user's cookies, which may be appended to HTTP requests transmitted by client system 130, and/or by the player 101 logging onto the online game.

In particular embodiments, player 101 may access an online game and control the game's progress via client system 130 (e.g., by inputting commands to the game at the client device). Client system 130 can display the game interface, receive inputs from player 101, transmitting user inputs or other events to the game engine, and receive instructions from the game engine. The game engine can be executed on any suitable system (such as client system 130, social networking system 120a, or game networking system 120b). As an example and not by way of limitation, client system 130 can download client components of an online game, which are executed locally, while a remote game server, such as game networking system 120b, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time player 101 provides an input to the game through the client system 130 (for example, by typing on the keyboard or clicking the mouse of client system 130), the client components of the game may transmit the player's input to game networking system 120*b*. In various embodiments, an online game can be embedded into a third-party website. The game can be hosted by the networking system of the third-party website, or it can be hosted on game system 120*b* and merely accessed via the third-party website. The embedded online game can be hosted solely on a server of game system 120*b* or using a third-party vendor server. In addition, any combination of the functions of the present disclosure can be hosted on or provided from any number of distributed network resources. For example, one or more executable code objects that implement all or a portion of the game can be downloaded to a client system for execution.

Figure 2:
FIG. 2 illustrates an example embodiment of a webpage-based game interface for an online game.

FIG. 2 illustrates an example of a webpage-based game interface for an online game accessed by a browser client 110 (e.g., Firefox, Chrome, Internet Explorer, etc.). In various embodiments, a user of a client system 130 can use a browser client to access the online game over the Internet (or other suitable network). The game interface 200 illustrated in FIG. 2 may be automatically generated and presented to the user in response to the user visiting or accessing the game operator's website or a third-party's website from client system 130 with a browser client. Game networking system 120*b* can transmit data to client system 130 allowing it to display game interface 200, which is typically some type of graphic user interface. For example, the webpage downloaded to client system 130 may include an embedded call that causes client system 130 to download an executable object, such as a Flash .SWF object, which executes on client system 130 and renders the game within the context of the webpage. Other interface types are possible, such as server-side rendering and the like. Game interface 200 is configured to receive signals from the user via client system 130. For example, the user can click on game interface 200, or enter commands from a keyboard or other suitable input device. The game engine can respond to these signals to allow game play. The display of game interface 200 can change based on the output of the game engine, the input of the player, and other signals from game system 120*b* and client system 130.

The game interface 200 can display various game components, such as the game environment, options available to the player (e.g., in-game actions, preferences, settings, etc.), game results, etc. Some components of the game interface 200 may be static, while others may be dynamic (e.g., changing with game play). The user may be able to interact with some components (e.g., player character, NPCs, virtual objects, etc.) and not interact with other components (e.g., the background of the virtual world, such as the virtual street or sidewalk). The user can engage in specific in-game actions or activities by providing input to game interface 200.

In the example online game illustrated in FIG. 2, the user controls a virtual city implemented in an online social game. The game interface 200 shows the virtual city and various components of the city. The player can interact with various elements of the virtual city, such as virtual business objects 202 and virtual housing objects 204. The user can click on (or otherwise activate) various aspects of the game interface to provide instructions to the game engine. The game interface 200 also shows one or more elements to aid in realism of the virtual city, such as NPCs 206. The NPCs 206 comprise one or more representations of persons who may be walking, sitting, eating, or otherwise engaged in some activity within the city in accordance with pre-determined or random activities determined by the game engine. Typically the user does not control the NPCs 206.

The user can also click on various icons in game interface 200 to activate various game options. For example, if the user clicks on one of the icons in option bar 208, the game engine will alter the game interface 200 to present the user with options for buying and selling virtual items for use in the virtual city. For example, the player could buy or sell virtual furniture, appliances, décor, windows, goods, etc. Similarly, the user can click on other icons in option bar 208 to access other game options.

One skilled in the art would appreciate that FIG. 2 is presented merely as an example of an embodiment of one type of online game and that the present disclosure is intended to encompass a variety of game types, including gambling games, role-playing games, puzzle games, etc.

Although some online games permit multiple players to interact with each other, such as via control of their respective player characters within an instance of the game, typically the interaction does not extend to user generated content (UGC) as it exists in social networking platforms. For example, UGC such as generating tweets or following tweets on Twitter are considered to be "real social," which is typically absent in online games. Accordingly, it would be beneficial to provide UGC as it exists in social networks with online games. It would also be advantageous to use UGC to facilitate social game play mechanic.

In some embodiments, the game engine is configured to provide information from a social network platform to an online game, provide user interaction features pertaining to the social network within the online game, coordinate synchronization of information between the social network and the game, and provides social game play mechanic for games that traditionally do not include social game play features. The social network may be hosted on the social networking system 120*a* or some other system. Examples of social networks include, but are not limited to, Twitter, Posterous, FriendFeed, Tumblr, Facebook, Dailybooth, 12 Seconds, micro blogging platforms, blogging platforms, social network platforms, and the like.

Figure 3:
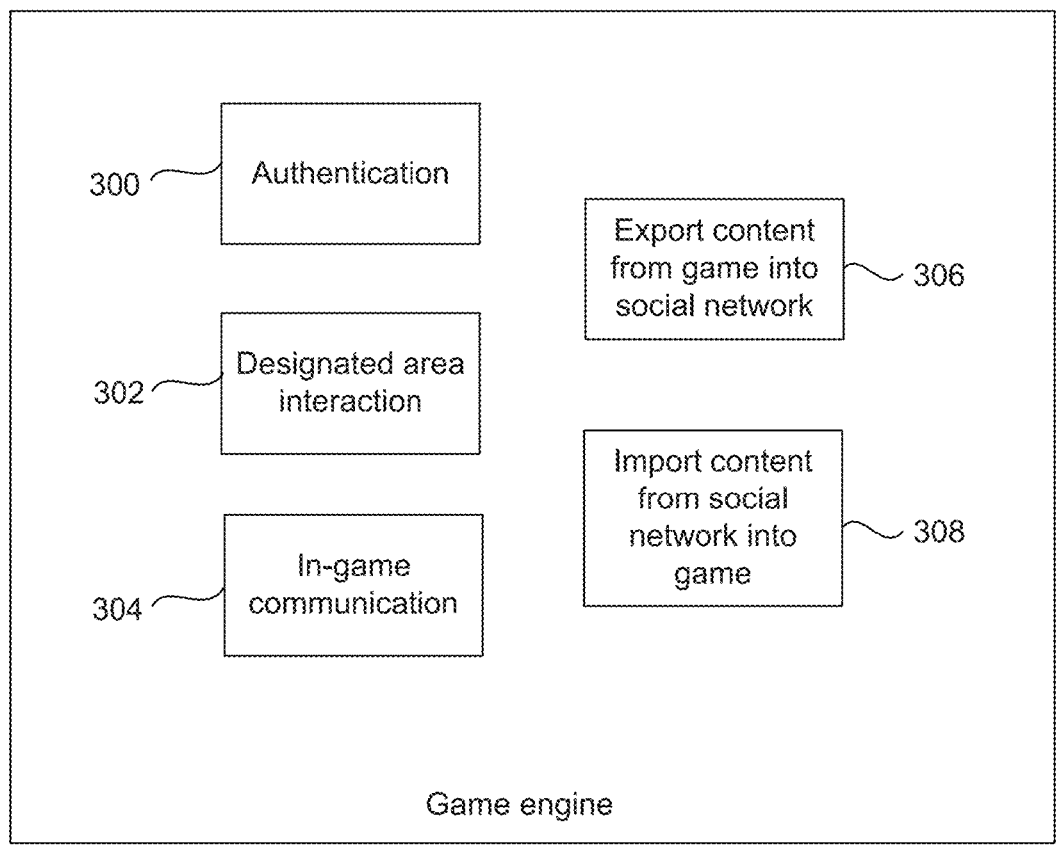
FIG. 3 illustrates an example embodiment of a game engine including modules to facilitate social game play using social network features.
Figure 4A:
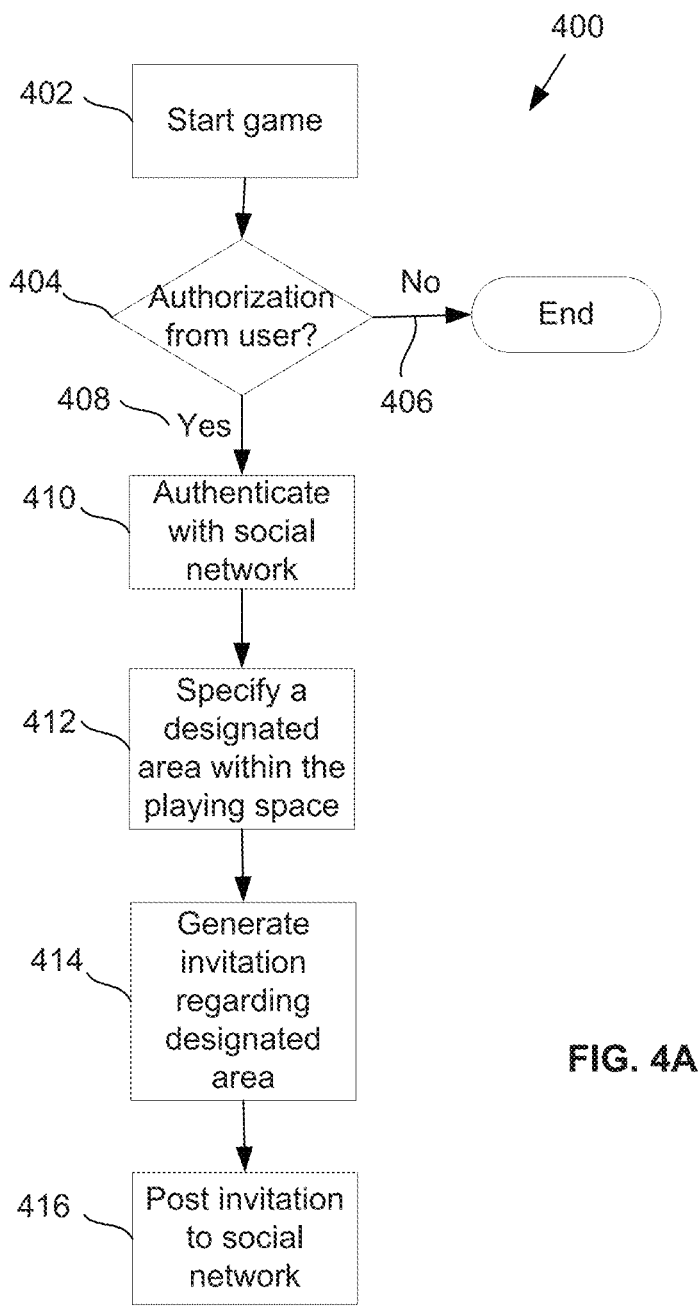
FIGS. 4A-4C illustrate flow diagrams for providing social game play using social network features according to example embodiments.

FIG. 3 illustrates an exemplary game engine that includes an authentication module 300, a designated area interaction module 302, an in-game communication module 304, an import content module 306, and an export content module 308. Modules 300-308 represent hardware, firmware, and/or software configured to integrate social network features with a game, and also to provide social game play mechanic in accordance with some embodiments. FIG. 4A illustrates an exemplary flow diagram 400 for initiating social game play according to some embodiments. FIG. 3 will be described in conjunction with FIGS. 4A-4C.

When an instance of an online game is started (block 402), the authentication module 300 is configured to check authorization from a user of the game about incorporating social network features into the game (block 404). The social network features comprise features and/or content associated with the user's account on a social network. In one embodiment, the game presents an authorization request to the user each time the game is accessed by the user. In another embodiment, the game presents an authorization request to the user once, and then the authorization is considered to be on-going in subsequent sessions of the game. In still another embodiment, the game presents an initial authorization request to the user and then periodically repeats the authorization request, because the user's authorization is valid for a pre-determined period of time or number of game sessions. (The user of the game may also be referred to as a player, first user, or celebrity.)

Figure 5A:
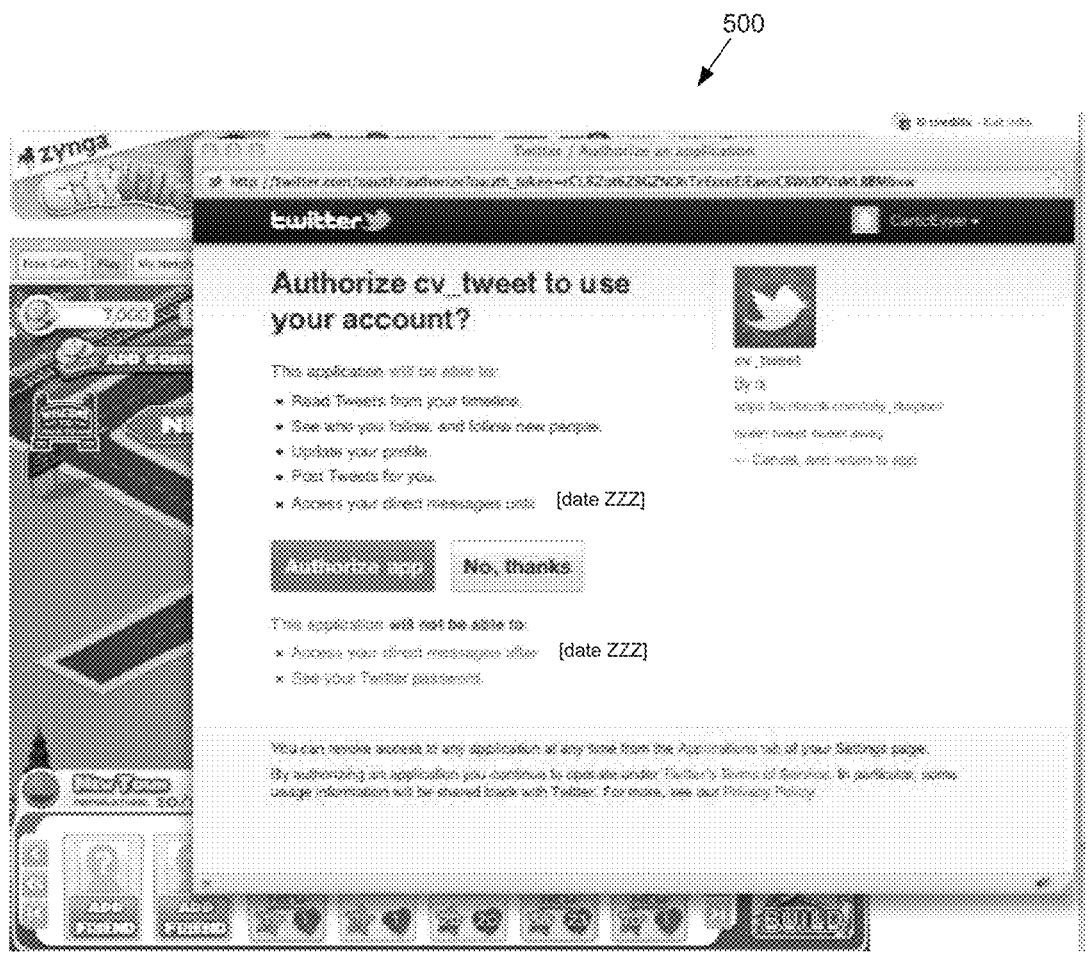
FIGS. 5A-5J illustrate exemplary user interface or webpages showing social game play using social network features according to example embodiments.

FIG. 5A illustrates an exemplary authorization request object 500 displayed to the user according to some embodiments. The authorization request object 500 provides a request to the user to authorize connecting with a social network such as, for example, Twitter. If the user declines the authorization request (no branch 406), then the game continues without incorporating social network features. Otherwise the user accepts the authorization request (e.g., clicks on the "Authorize app" button in screenshot 500) (yes branch 408), and the user has authorized the game to access content associated with his or her account at the social network.

In one embodiment, the authentication module 300 performs authentication for the particular user with the social network (block 410) using an authentication protocol such as, but not limited to, OAuth. OAuth is configured to provide secure application programming interface (API) authorization. OAuth permits the user to approve an application (e.g., an online game) to act on his/her behalf without sharing his/her social network password with the application. A successful authentication typically returns to the game an access token or some kind of authorization/authentication identifier for the particular user. This access token is stored by the game for subsequent use. Continuing the above example, the access token permits the game to communicate with one or more Twitter APIs. Twitter REST API, Twitter Streaming API, and/or Twitter Search API are examples of particular Twitter APIs that may be accessed to obtain Twitter content associated with the user, as discussed below. In another embodiment, rather than using OAuth, Hypertext Transfer Protocol (HTTP) basic authentication may be used to access one or more Twitter APIs.

Figure 5B:
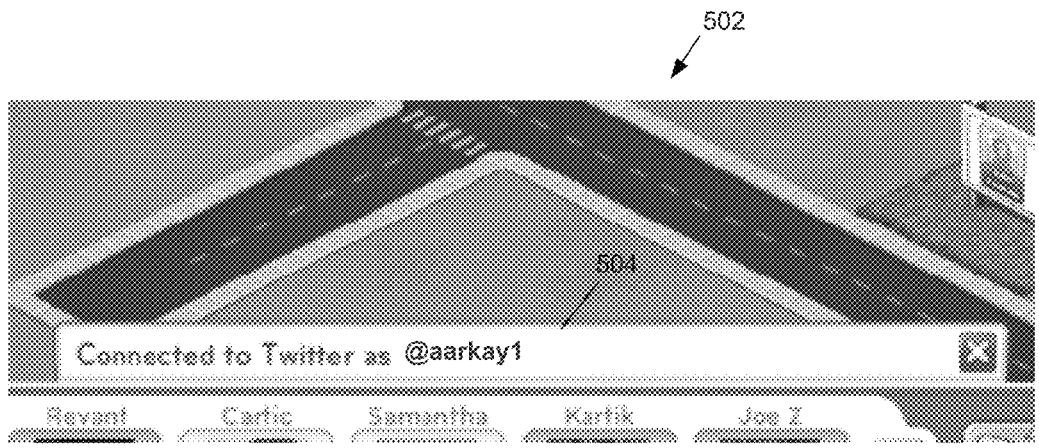

FIG. 5B illustrates an exemplary connection notification object 504 included in the game interface 200 that indicates to the user that the authentication was successful and a connection with the social network, in particular, a connection with Twitter content associated with the user, has been established. In the example of FIG. 5B, the user's user name in Twitter is aarkay1.

Figure 5C:
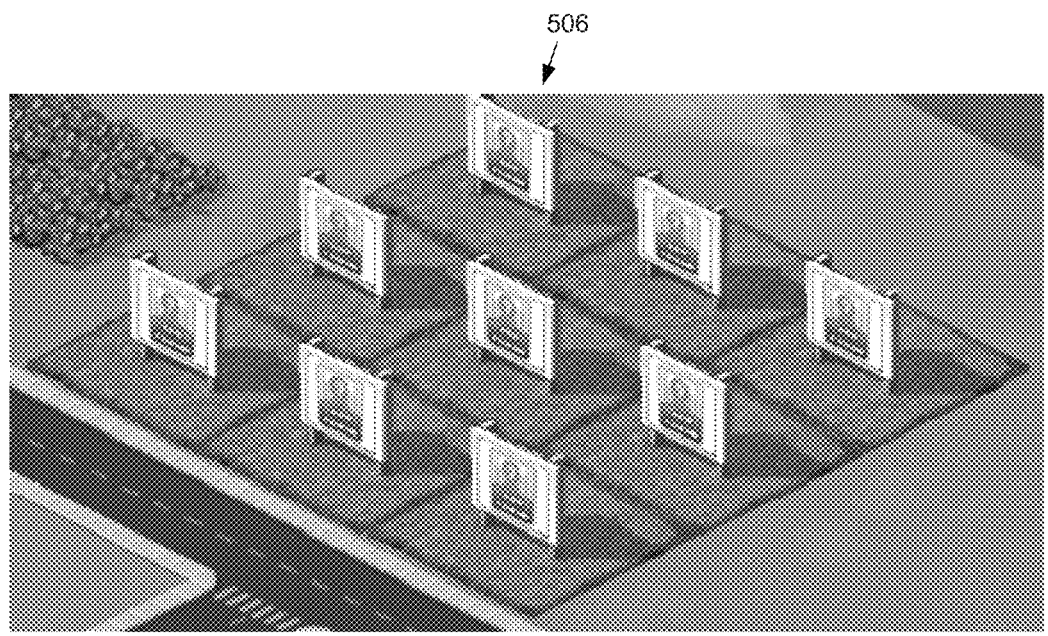

Next in a block 412, the user specifies a particular portion of the virtual playing space of the game to use for social game play. The particular portion of the virtual playing space is also referred to as a designated area within the playing space. FIG. 5C shows an example designated area 506 within the playing space comprising a portion of a virtual city. To be described in detail below, the user invites others to build city objects within the designated area 506, from which the user selects one submission for actual incorporation into the user's virtual city. Traditionally the designated area 506 and the rest of the user's virtual city would be inaccessible to everyone other than the user (or at least not accessible to anyone who doesn't know the user's user name and password for the game). The designated area interaction module 302 is configured to receive the user's identification of the designated area and track activities associated with the designated area.

Figure 5D:
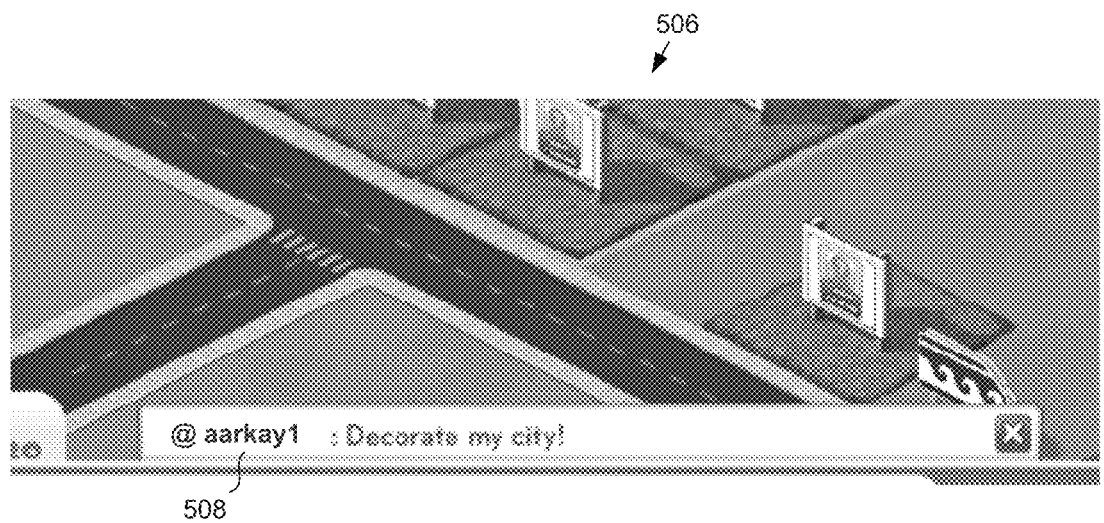

Once a designated area has been selected, the user generates an invitation from within the game for others to play within the designated area (block 414). The in-game communication module 304 is configured to facilitate user generated content regarding the designated area (e.g., for others to engage in social game play in the designated area). In FIG. 5D, a content generation interface 508 is provided in the game for the user to compose an invitation or request to build in the designated area of the user's virtual city. The content generation interface 508 shows, for example, the user starting to generate a message about the designated area (e.g., "Decorate my city!"). The in-game communication module 304 may work in conjunction with the designated area interaction module 302 to automatically append additional content to the user generated content. For example, a link to access the designated area may be appended to the user generated content so that person(s) receiving the user's invitation may merely click on the provided link to start building or decorating the designated area. Alternatively, the in-game communication module 304 may be configured to automatically generate an invitation in response to the user specifying the designated area within the user's playing space.

Figure 5E:
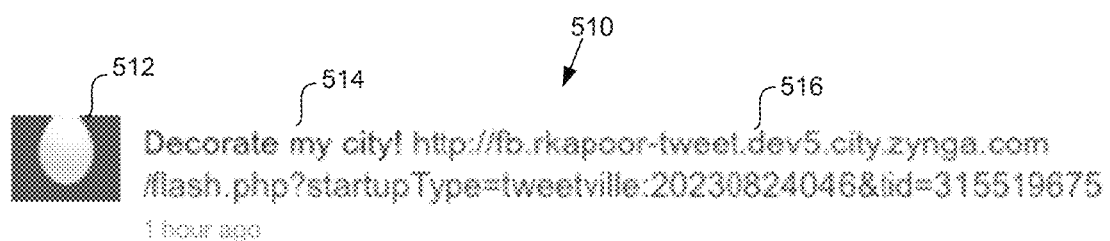

When the user completes composing the invitation, the export content module 306 (automatically) posts the invitation (along with any appended content) to the social network (block 416). Continuing the Twitter example, the export content module 306 uses the Twitter APIs (and stored access token) to post the message without knowing or using the user's Twitter password. The posted message, also referred to as a tweet, is automatically provided to the Twitter users that subscribes to or follows the game player on Twitter. These Twitter subscribers or followers are also referred to as the user's followers, friends, or subscribers. In FIG. 5E, an exemplary Twitter post 510 is shown displayed on the user's follower's Twitter page, that corresponds to the user generated invitation. The Twitter post 510 comprises an identifier 512 of the user (e.g., a picture of the user), a user generated message 514 (as composed by the user in interface 508), and an appended content 516 (e.g., a link to access the designated area). A link included in the appended content 516 comprises a uniform resource locator (URL) to a particular page pertaining to the designated area provided by the game engine. Although not shown, the appended content 516 may include additional information such as an inducement by the game to tempt the user's followers to build in the designated area. Possible inducement includes, but is not limited to, information about prizes for winning submissions.

Figure 4B:
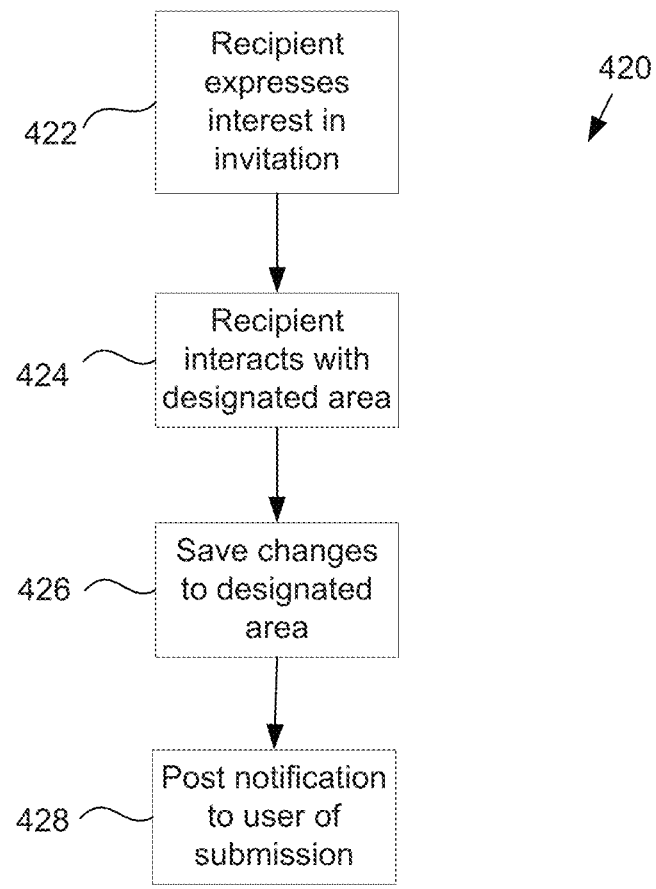
Figure 5F:
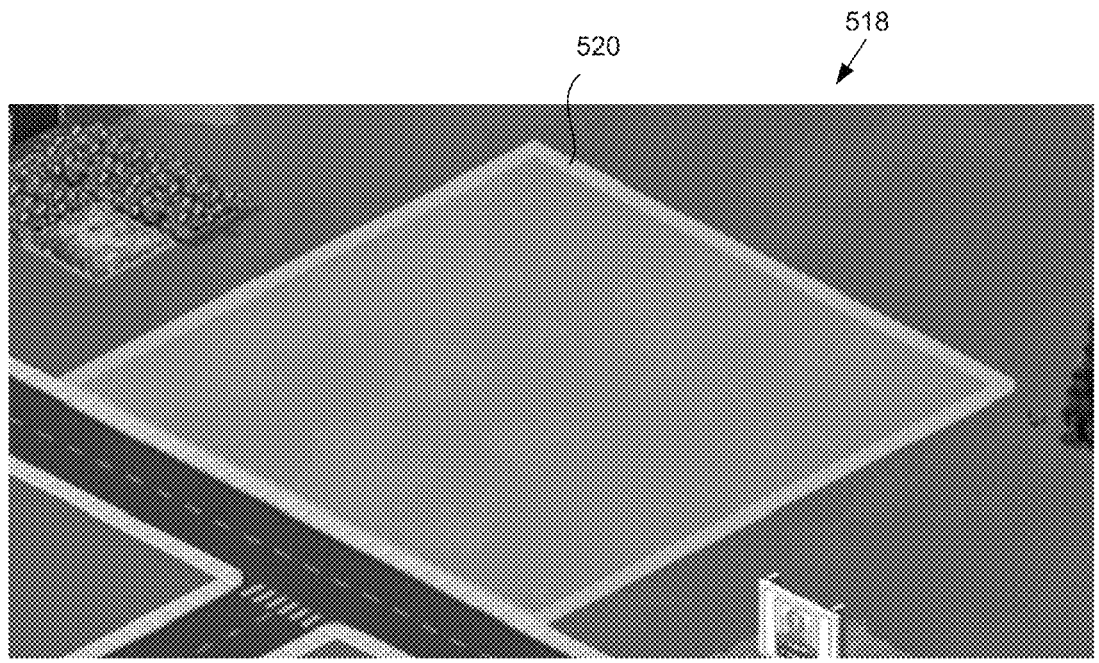

FIG. 4B illustrates an exemplary flow diagram 420 of actions performed by the user's followers in response to the user's invitation to join in social game play (e.g., build or decorate a designated area of the user's virtual city) according to some embodiments. In a block 422, a user's follower that received the Twitter post 510 expresses interest from his/her social network page in building in the designated area. As an example, the user's follower may click on the link included in the appended content 516 of the Twitter post 510. In response, the user's follower is taken to a designated area page 518 (FIG. 5F) provided by the game engine (block 424). The designated area page 518 is configured to permit the user's follower to interact only within a designated area 520 specified by the user, as opposed to letting the user's follower have access to all of the user's virtual city. Although not shown, the designated area interaction module 302 provides tools in the designated area page 518 that permits the user's follower to build, decorate, play, or otherwise interact with the designated area 520. The user's follower interacts with the designated area 520 similar to the way that the user can engage in game play within the virtual city. The designated area page 518 includes tools for the follower to access or buy virtual items for use in the designated area (e.g., virtual furniture, appliances, décor, buildings, etc.). Using these virtual items, the follower can build, for example, a café, playground, park, house, or the like within the designated area 520. As another example, the user's follower may build a simple or elaborate structure within the designated area 520.

For example, if the user clicks on one of the icons in option bar 208, the game engine will alter the game interface 200 to present the user with options for buying and selling virtual items for use in the virtual city. For example, the player could buy or sell virtual furniture, appliances, décor, windows, goods, etc. Similarly, the user can click on other icons in option bar 208 to access other game options.

Figure 5G:

Once the user's follower has completed interacting with the designated area 520, the result (also referred to as a follower's submission, play result, play change, or play interactions) is saved (block 426) by the game engine. Then the user's follower generates a message to the user providing notification of the completed effort (block 428). The message represents the user's follower's submission to the user. In one embodiment, the game engine provides an interface within the game for the user's follower to compose the notification message and then the notification message is automatically posted in the social network by the export content module 308. In another embodiment, the user's follower generates the notification message directly on the social network platform. In an alternate embodiment, the game engine is configured to automatically generate and post a notification message to the social network when the user's follower saves modifications to the designated area (or otherwise indicates completion of building in the designated area). In any case, the notification message is displayed on the user's social network page. FIG. 5G shows the user's Twitter page including a first post 522, a second post 524, and a third post 526. The first post 522 comprises the invitation from the user (in this example, the user's user name is aarkay1) to build or decorate his/her city in a separate online game. The second post 524 comprises a notification message from a user's follower (in this example, the user's follower is CarticEyyer) that he/she has completed building in the designated area. The third post 526 comprises a notification message from another of the user's follower (in this example, the user's follower is davetTester) that he/she has also completed building in the designated area.

Blocks 422-428 are performed for each of the user's followers that wishes to build, decorate, play, or otherwise interact in the designated area. In one embodiment, a given follower may even submit more than one submission to the user. It is understood that each follower's modifications to the designated area is not cumulative of each other. Instead, the designated area interaction module 302 provides a different instance of the designated area page 518 to each follower and separately keeps track of each follower's modifications to the designated area. As such, in FIG. 5G, all of follower CarticEyyer's changes to the (empty) designated area 520 comprises a submission, and all of follower davetTester's changes to the (empty) designated area 520 comprises a separate submission.

If the user's invitation to decorate his/her city (e.g., Twitter post 510) or at least the link included in the invitation is forwarded or retweeted to other persons (persons other than the user's followers), then those persons also have access to the designated area 520 by clicking on the link. Those persons can similarly interact with the designated area as discussed above for blocks 422-428 to provide a submission to the user. All persons who receive the invitation (directly or indirectly) are considered to be recipients of the invitation.

Figure 4C:
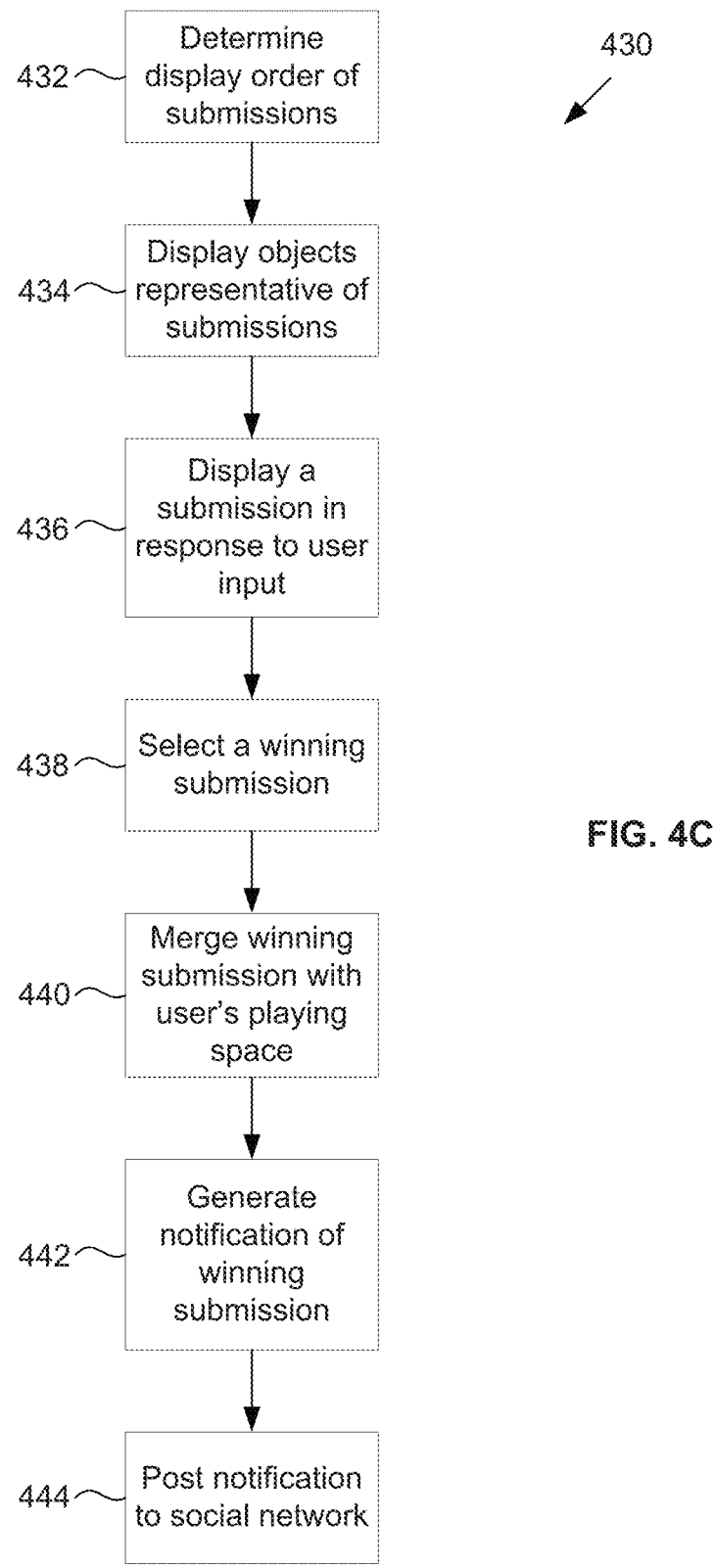

FIG. 4C illustrates an exemplary flow diagram 430 of activities taken in response to submissions (also referred to as entries, bids, or the like) from one or more persons according to some embodiments. When the user logs into the game after at least one designated area submission has been made, the designated area interaction module 302 determines a presentation order of those submissions to the user within the game (block 432). If there is only one submission, block 432 may be omitted. The submission(s) may be presented to the user if there is at least one submission, or after a pre-determined period of time after the user issues the invitation for others to build in the designated area.

The sorting order of the submissions for purposes of presenting to the user can be based on one or more pre-determined criteria. In one embodiment, the greater the worshipping actions by a person to the user, the closer that person's submission will be to being the first submission presented to the user. Worshipping actions include, but are not limited to, number of @Mentions, number of Retweets, or the like. In another embodiment, the sorting order may merely be the order in which the submissions were completed. In still another embodiment, the submissions that are the most elaborate, most use of building objects, most use of cash items (or higher value) items, and/or use of objects that are themed around a celebrity may be the sorting criteria. In other embodiments, the game engine may use other criterion that promotes certain goals pertaining to the game.

Figure 5H:
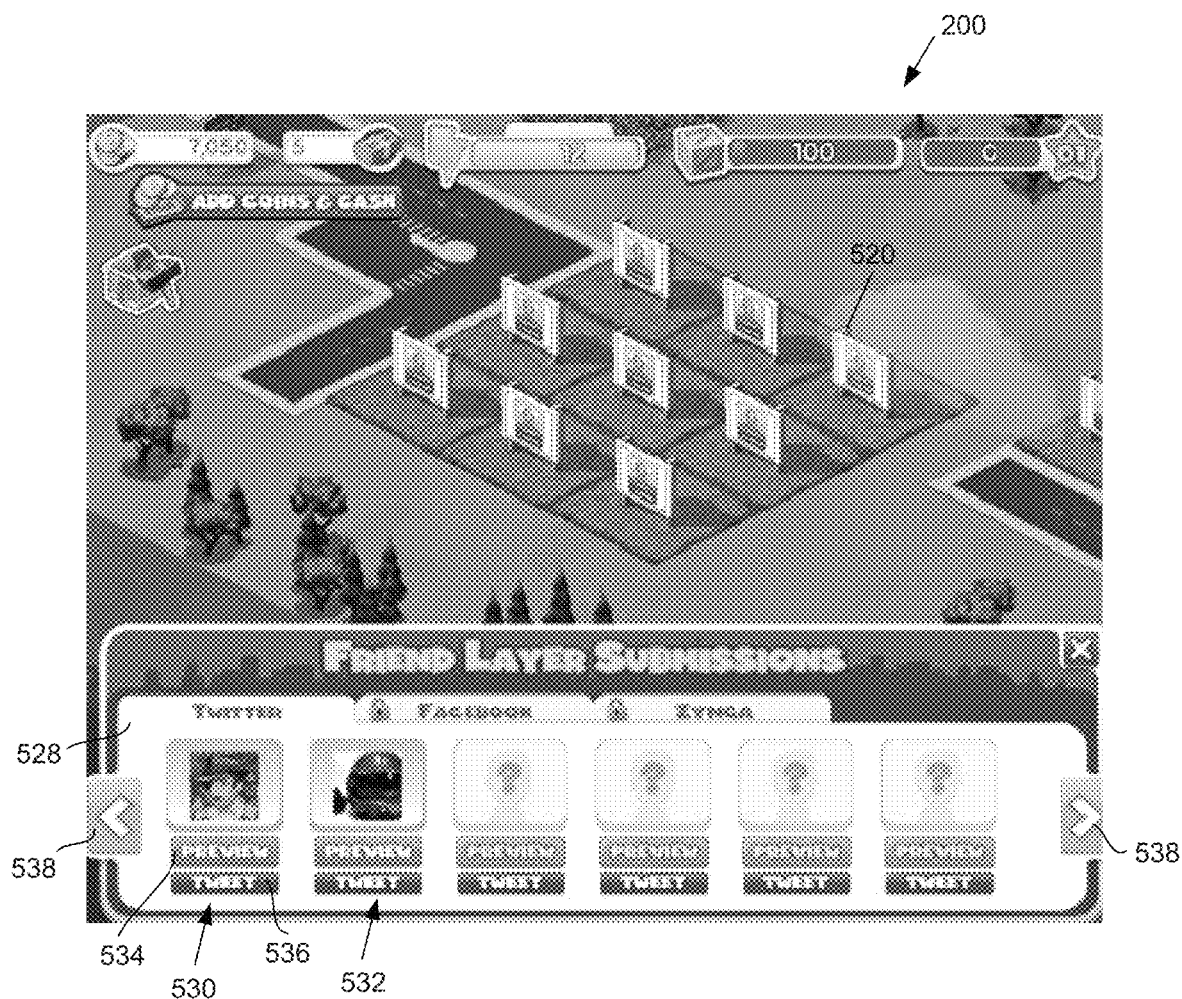

Next in a block 434, the submissions are displayed to the user in the game. The submissions are initially presented as thumbnails or objects in the order determined in the block 432. Then when the user expresses an interest in viewing a particular submission, a full view of that submission is presented to the user. FIG. 5H shows the game interface 200 including the designated area 520 (for now empty) and a submission interaction bar 528. The submission interaction bar 528 includes objects corresponding to the submissions: a first object 530 corresponding to a first submission, a second object 532 corresponding to a second submission, etc. Each object includes a graphical icon or picture representative of the person that provided the submission, a button to view the submission (e.g., preview button 534), and a button to compose a message to the person that provided a submission for posting in the social network (e.g., tweet button 536). The submission interaction bar 528 further includes a pair of arrows 538 to scroll through all the objects corresponding to the submissions.

Figure 5I:
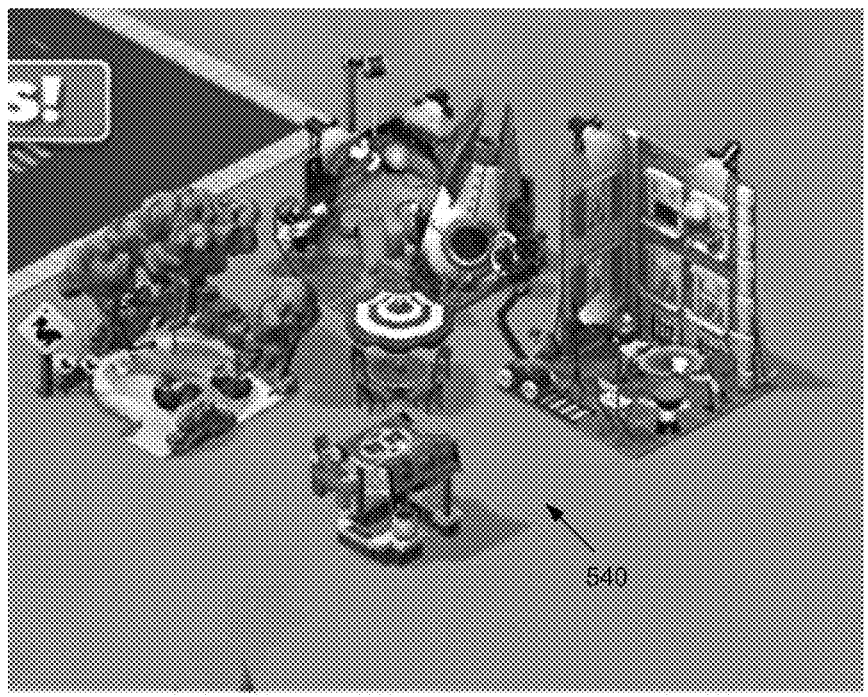

If, for example, the user clicks on the preview button 534 to view the first submission (block 436), the designated area interaction module 302 facilitates displaying the first submission to the user. FIG. 5I illustrates an exemplary designated area submission 540 displayed to the user. The user can click on preview buttons for other submission(s) and the designated area interaction module 302 similarly facilitates display of those submissions to the user. Alternatively, the user may mouse-over or otherwise indicate interest in a particular submission from among the plurality of submissions, and the game engine displayed the particular submission to the user for review.

The user may take any number of actions with respect to one or more submissions. For example, the user may discard submission(s) that he/she considers to be substandard. As another example, the user may annotate worthy submission(s) for later reference. Once the user selects a winning submission from among the plurality of submissions (block 438), that submission is merged into the user's playing space (block 440). The designated area of the user's virtual city is updated from an empty space or plot into whatever building, decoration, or modifications the winning submission had for the designated area.

Figure 5J:
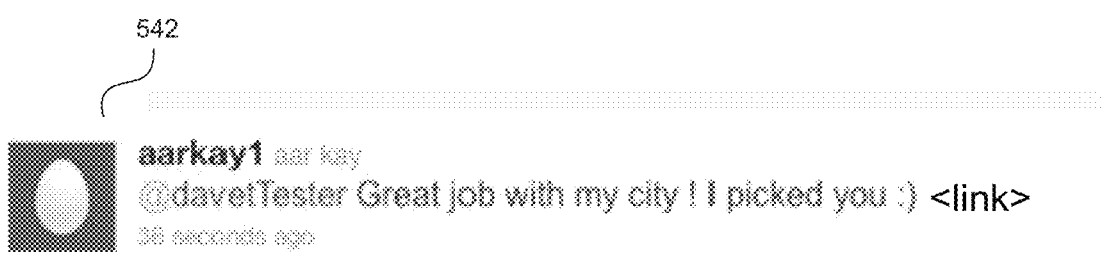

The user composes a message from within the game to notify the person that submitted the winning submission that his/her submission was the winning submission (block 442). The in-game communication module 304 is configured to facilitate message compositions from within the game. A messaging interface similar to that shown in FIG. 5D may be provided for the user to input a message. The message is then automatically posted to the social network by the export content module 306 (block 444). Continuing the Twitter example, the Twitter post or tweet from the user may be in the following format: @<winner> Thanks! You won. Here is your reward <link>. FIG. 5J shows an exemplary Twitter post 542 from the user of the game (e.g., aarkay1) congratulating the submission winner (e.g., davetTester) and optionally including a reward link.

The reward (also referred to as a gift) may be redeemed by clicking on a link for a uniform resource locator (URL) to a particular page provided by the game engine. The reward may encompass a variety of rewards selected by the game engine. In one embodiment, the same default gift may be provided to all social network posts (that also indicated inclusion of a gift) generated within the game. In another embodiment, the game engine may be configured to provide customized gifts depending on the profile of the user or the follower. For example, if the user has a large number of followers, the user may be deemed to be influential and it may be advantageous to provide gifts to the user's followers that are more generous than a default gift. Similarly, if the user or follower is a known celebrity or other well-known person, it may be advantageous to provide a higher than average gift to entice that person to play the game and spread the word about the game. In still another embodiment, the user's activities within the game (e.g., how much time is spent playing the game or how much money is spent playing the game) may determine the level of gift to send to the user's follower. In yet still another embodiment, the game engine may randomly select from a pre-set group of gifts. In another embodiment, the game engine may study the click-through success rate of sent gifts and increase successive use of those gifts with the highest click-through success rates.

Examples of gifts include, but are not limited to, a certain amount of points, currency, items, or other items having a denomination of value within the game, a monetary credit that can be used as real money within the game, an insider tip to advance in the game, other real or virtual item pertaining to game play, and the like. The denominational value or type of gift may change over time and may encompass any possibility that relates to playing or joining the game.

In some embodiments, the user may also post a message to all the people who provided a submission to provide closure such as, for example, announcing the winner, providing a link to view the winning submission, and the like. In other embodiments, persons who submitted a submission but were not winners (or were one of the top five submissions) may also get a nominal reward.

In this manner, there is provided seamless integration of an online game with a social network. The integration leverages the narcissism aspects of the social network—e.g., Twitter followers compete for the game player's attention—and provides a social game play mechanic for games that are not typically configured for social game play—e.g., Twitter followers can access and build/decorate/interact with at least a part of the game player's playing space. Provisioning the social game play mechanic with social network features opens up a new distribution channel of potentially millions of players to the game. Especially when the user of the game that initiates the invitation for others to decorate his/her city is in fact a well-known celebrity, the user's large number of followers in the social network represents a built-in distribution channel to engage new players into the game.

Figure 6:
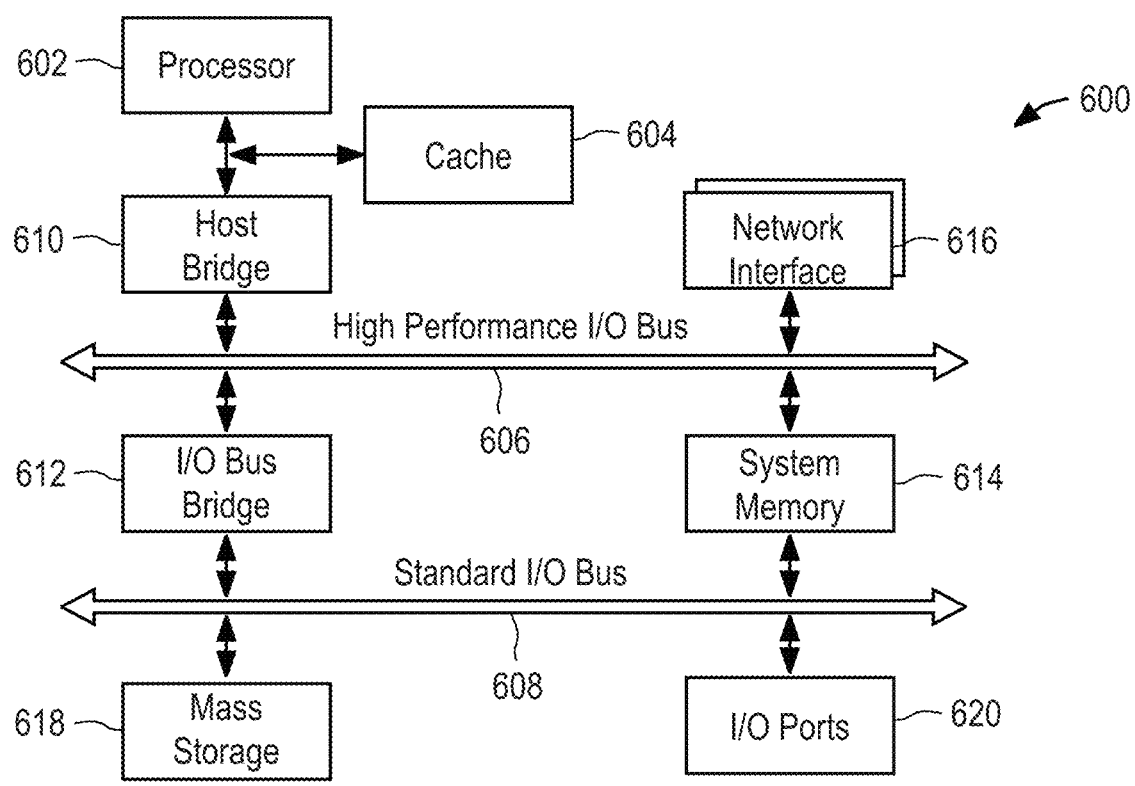
FIG. 6 illustrates an example computing system architecture, which may be used to implement one or more components of the system of FIG. 1.

FIG. 6 illustrates an example computing system architecture, which may be used to implement the server 120*a*, 120*b*, or the client system 130. In one embodiment, hardware system 600 comprises a processor 602, a cache memory 604, and one or more executable modules and drivers, stored on a tangible computer readable medium, directed to the functions described herein. Additionally, hardware system 600 may include a high performance input/output (I/O) bus 606 and a standard I/O bus 608. A host bridge 610 may couple processor 602 to high performance I/O bus 606, whereas I/O bus bridge 612 couples the two buses 606 and 608 to each other. A system memory 614 and one or more network/communication interfaces 616 may couple to bus 606. Hardware system 600 may further include video memory (not shown) and a display device coupled to the video memory. Mass storage 618 and I/O ports 620 may couple to bus 608. Hardware system 600 may optionally include a keyboard, a pointing device, and a display device (not shown) coupled to bus 608. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 600 are described in greater detail below. In particular, network interface 616 provides communication between hardware system 600 and any of a wide range of networks, such as an Ethernet (e.g., IEEE 802.3) network, a backplane, etc. Mass storage 618 provides permanent storage for the data and programming instructions to perform the above-described functions implemented in servers, whereas system memory 614 (e.g., DRAM) provides temporary storage for the data and programming instructions when executed by processor 602. I/O ports 620 are one or more serial and/or parallel communication ports that provide communication between additional peripheral devices, which may be coupled to hardware system 600.

Hardware system 600 may include a variety of system architectures and various components of hardware system 600 may be rearranged. For example, cache 604 may be on-chip with processor 602. Alternatively, cache 604 and processor 602 may be packed together as a "processor module," with processor 602 being referred to as the "processor core." Furthermore, certain embodiments of the present disclosure may not require nor include all of the above components. For example, the peripheral devices shown coupled to standard I/O bus 608 may couple to high performance I/O bus 606. In addition, in some embodiments, only a single bus may exist, with the components of hardware system 600 being coupled to the single bus. Furthermore, hardware system 600 may include additional components, such as additional processors, storage devices, or memories.

An operating system manages and controls the operation of hardware system 600, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

In this manner, user generated content from within an online game posts to a social network platform in real-time (or near real-time), that in turn draws recipients of the content from the social network into the game to engage in social game play. Recipients engaging in social game play have restricted access to the playing space, in accordance with limitations set by the actual player associated with the playing space. Once recipients' interaction with the playing space is completed, the actual player associated with the playing space can selectively review the recipients' interactions and select a particular recipient's interaction submission for incorporation into the playing space. As the actual player reviews and selects from among the interaction submissions by the recipients, additional user generated content from within the game also posts to the social network platform in real-time (or near real-time).

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. Still further, while the embodiments described above operate with business-related virtual objects (such as stores and restaurants), the invention can be applied to any in-game asset around which a harvest mechanic is implemented, such as a virtual stove, a plot of land, and the like. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method for providing social game play using social network features, the method comprising:

receiving, from a first computing device of a first user, first content pertaining to a designation selection selected by the first user of a designated area, the designated area comprising a portion of a playing space of the first user in an online game;

sending the first content received from the first user for display in a social network external to the online game to each of a plurality of users having respective social network connections with the first user in the social network;

receiving a play request, from each of a second computing device of a second user and a third computing device of a third user, to play in the designated area, the second and the third users being among the plurality of users having respective social network connections with the first user;

receiving, from the first computing device of the first user, a respective authorization to each of the second user and the third user to allow access to the designated area by each of the second user and the third user;

generating a first additional instance of the designated area and a second additional instance of the designated area, the first and the second additional instances of the designated area having a current state of the designated area within the playing space of an online game;

providing, according to the respective authorization, via one or more processors, the second user access to the first additional instance of the designated area and further providing to the third user access to the second additional instance of the designated area;

saving for preview by the first user, a first play result selected by the second user for the first additional instance of the designated area and saving a second play result selected by the third user for the second additional instance of the designated area, wherein the first play result comprises a first changed state of the current state of the designated area represented in the first additional instance of designated area and the second play result comprises a second changed state of the current state of the designated area represented in the second instance of the designated area;

generating a first social network notification describing the first changed state and a second social network notification describing the second changed state;

sending the first and the second social network notifications to the social network external to the online; and receiving a selection by the first user to merge at least one of the first and the second changed states into the current state of the designated area.

2. The method of claim 1, wherein receiving a selection by the first user to merge at least one of the first and the second changed states game comprises:

updating the current state of the designated area with at least one of the first and the second the changed states.

3. The method of claim 1, wherein, the social network comprises Twitter, and the plurality of users comprises followers of the first user.

4. The method of claim 1, wherein the social network comprises Twitter, and the plurality of users comprises followers of the first user, wherein the first and second authorization to allow access to the designated area comprise a respective posting to each Twitter page of a respective follower of the first user, wherein the post includes a uniform resource locator representative of an address of the designated area.

5. A non-transitory computer readable medium including instructions, which when executed by a processor, causes the processor to perform operations comprising:

receiving, from a first computing device of a first user, first content pertaining to a designation selection selected by the first user of a designated area, the designated area comprising a portion of a playing space of the first user in an online game;

sending the first content received from the first user for display in a social network external to the online game to each of a plurality of users having respective social network connections with the first user in the social network;

receiving a play re quest, from each of a second computing device of a second user and a third computing device of a third user, to play in the designated area, the second and the third users being among the plurality of users having respective social network connections with the first user;

receiving, from the first computing device of the first user, a respective authorization to each of the second user and the third user to allow access to the designated area by each of the second user and the third user;

generating a first additional instance of the designated area and a second additional instance of the designated area, the first and the second additional instances of the designated area having a current state of the designated area within the playing space of an online game;

providing, according to the respective authorization, the second user access to the first additional instance of the designated area and further providing to the third user access to the second additional instance of the designated area;

saving, for preview by the first user, a first play result selected by the second user for the first additional instance of the designated area and saving a second play result selected by the third user for the second additional instance of the designated area, wherein the first play result comprises a first changed state of the current state of the designated area represented in the first additional instance of designated area and the second play result comprises a second changed state of the current state of the designated area represented in the second instance of the designated area; and generating a first social network notification describing the first changed state and a second social network notification describing the second changed state;

sending the first and the second social network notifications to the social network external to the online; and receiving a selection by the first user to merge at least one of the first and the second changed states into the current state of the designated area.

6. The computer readable medium of claim 5, wherein receiving a selection by the first user to merge at least one of the first and the second changed states comprises:

updating the current state of the designated area with at least one of the first and the second the changed states.

7. The computer readable medium of claim 5, wherein the social network comprises Twitter, and the plurality of users comprises followers of the first user.

8. A computer system comprising:

a processor;

a memory device holding an instruction set executable on the processor to cause the computer system to perform operations comprising:

receiving, from a first computing device of a first user, first content pertaining to a designation selection selected by the first user of a designated area, the designated area comprising a portion of a playing space of the first user in an online game;

sending the first content received from the first user for display in a social network external to the online game to each of a plurality of users having respective social network connections with the first user in the social network;

receiving a play request, from each of a second computing device of a second user and a third computing device of a third user, to play in the designated area, the second and the third users being among the plurality of users having respective social network connections with the first user;

receiving, from the first computing device of the first user, a respective authorization to each of the second user and the third user to allow access to the designated area by each of the second user and the third user;

generating a first additional instance of the designated area and a second additional instance of the designated area, the first and the second additional instances of the designated area having a current state of the designated area within the playing space of an online game;

providing, according to the respective authorization, the second user access to the first additional instance of the designated area and further providing to the third user access to the second additional instance of the designated area;

saving, for preview by the first user, a first play result selected by the second user for the first additional instance of the designated area and saving a second play result selected by the third user for the second additional instance of the designated area, wherein the first play result comprises a first changed state of the current state of the designated area represented in the first additional instance of designated area and the second play result comprises a second changed state of the current state of the designated area represented in the second instance of the designated area; and generating a first social network notification describing the first changed state and a second social network notification describing the second changed state;

sending the first and the second social network notifications to the social network external to the online; and receiving a selection by the first user to merge at least one of the first and the second changed states into the current state of the designated area.

9. The system of claim 8, wherein receiving a selection by the first user to merge at least one of the first and the second changed states comprises:

updating the current state of the designated area with at least one of the first and the second the changed states.

\* \* \* \* \*

UNITED STATES PATENT AND TRADEMARK OFFICE
CERTIFICATE OF CORRECTION

PATENT NO. : 9,604,130 B1
APPLICATION NO. : 13/474437
DATED : March 28, 2017
INVENTOR(S) : Ayyar et al.

Page 1 of 1

It is certified that error appears in the above-identified patent and that said Letters Patent is hereby corrected as shown below:

In the Specification

Column 5, Line 26, after "client", delete "110"

Column 6, Line 52, delete "306," and insert --308,-- therefor

Column 6, Line 53, delete "308." and insert --306.-- therefor

Column 9, Line 27, delete "308." and insert --306.-- therefor

In the Claims

Column 15, Line 39, Claim 5, delete "re quest," and insert --request,-- therefor Column 17, Line 6, Claim 9, after "claim 8,", delete "¶"

Signed and Sealed this
Fourteenth Day of April, 2020

Andrei Iancu
*Director of the United States Patent and Trademark Office*